(No Model.)
M. P. SCHETZEL.
TAP OR FAUCET.
No. 526,327. Patented Sept. 18, 1894.
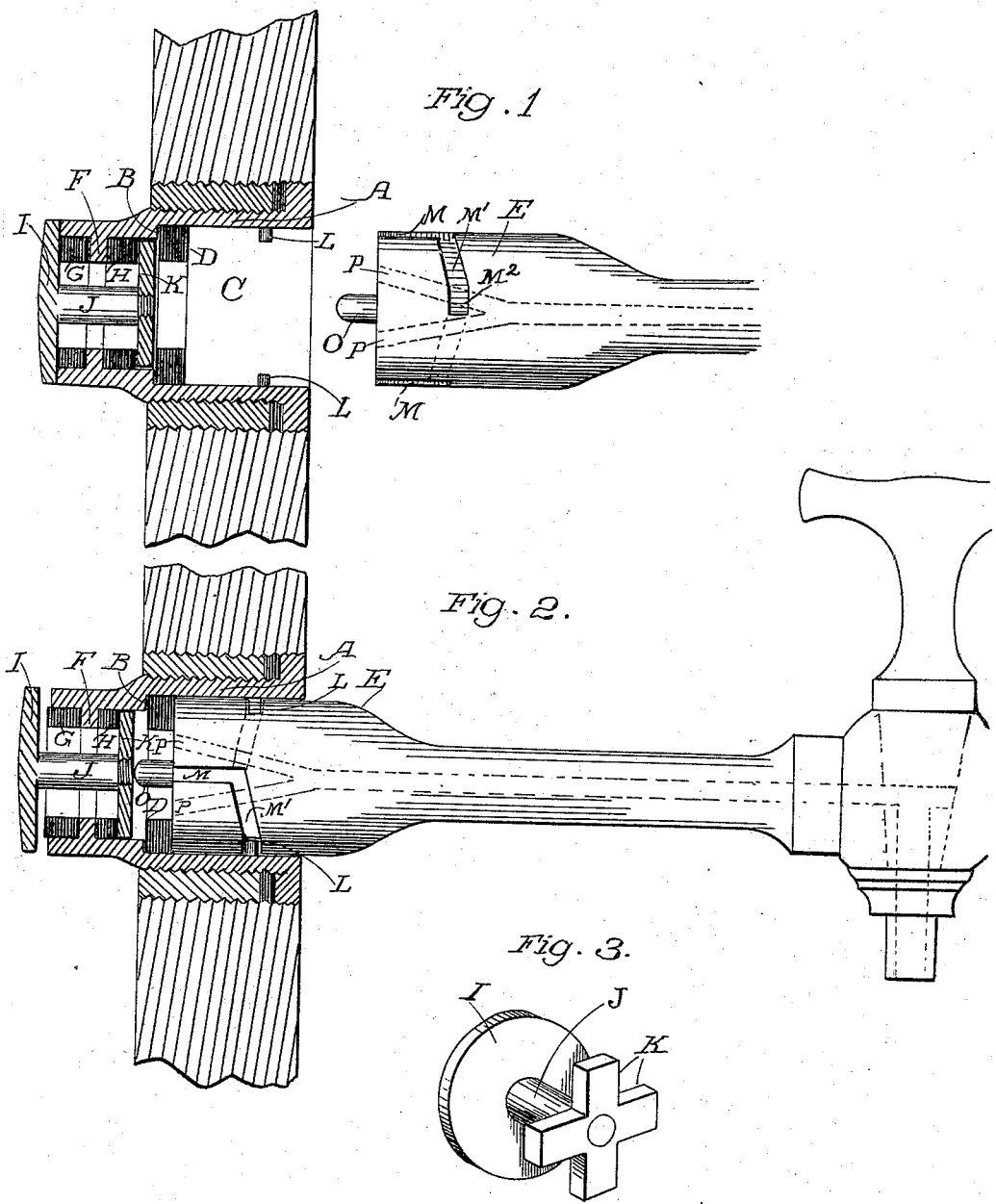

UNITED STATES PATENT OFFICE.

MARX PETER SCHETZEL, OF SAN FRANCISCO, CALIFORNIA.

TAP OR FAUCET.

SPECIFICATION forming part of Letters Patent No. 526,327, dated September 18, 1894.

Application filed November 8, 1893. Serial No. 490,371. (No model.)

*To all whom it may concern:*

Be it known that I, MARX PETER SCHETZEL, a citizen of the United States, residing in the city and county of San Francisco, State of California, have invented an Improvement in Taps or Faucets; and I hereby declare the following to be a full, clear, and exact description of the same.

My invention relates to improvements in means for tapping casks and receptacles so as to withdraw the liquid therefrom.

It consists in certain details of construction which will be more fully explained by reference to the accompanying drawings, in which—

Figure 1 is a longitudinal section showing the valve closed. Fig. 2 is a similar section showing it open. Fig. 3 is a view of the valve and cross head.

The object of my invention is to provide a simple closing device for casks containing beer or other liquids with an insertible, removable bushing, and a valve so closed with relation to the bushing as to allow the interior of the cask to be pitched without removing the bushing and valve, at the same time to present no obstruction to the opening of the valve afterward, and by the employment of elastic compression springs upon opposite sides of an interior flange or shoulder, to open and close the valve by the alternate compression of the springs.

A is a sleeve or bushing adapted to fit the cask or vessel into which it is secured, either by screwing or otherwise, and it may remain permanently in the cask. The interior of this bushing is formed with a shoulder B at the bottom of the exterior cylindrical chamber C, this shoulder forming the offset between the larger diameter of the exterior chamber and the smaller diameter of the interior chamber. Upon the shoulder B is fitted a washer D made of soft elastic rubber, and serving as a seat and packing for the end of the faucet barrel E which is introduced into the outer end of the bushing as will be hereinafter described. The interior chamber of the bushing has a circular flange or collar F projecting inwardly and serving as a seat for two elastic washers G and H.

I is a circular disk valve of the same exterior diameter as that of the inner end of the bushing A. This valve has a stem J of smaller diameter extending inwardly and firmly secured to the cross K, so that when the valve is closed the cross stands across the inner chamber just inside the shoulder B. Before the parts are put in place, the washer G is inserted so as to rest upon the circular flange F, and the washer H is also introduced from the opposite end of the bushing so as to rest upon the opposite side of this flange. The washer G projects slightly outside of the end of the bushing so that when the valve I is closed, it will form a close joint with this washer, and will compress it sufficiently to allow the periphery of the valve to rest and form a close joint with the end of the bushing. This allows the interior of the cask to be pitched or lined in the usual manner without in any way interfering with the valve or bushing, as the valve can afterward be opened and the pitch which covers it will be broken away by the opening of the valve so as to allow the liquid to pass without obstruction. The washer H is made of sufficient depth so that when the cross K has been screwed or riveted upon the inner end of the valve stem J, the elastic pressure of the washer H will always be sufficient to draw the valve I closely against the end of the bushing, and the expansion of the washer H is such that its elasticity will close the valve perfectly and compress the washer G to the little extent that is necessary to allow the valve to close flush against the end of the bushing.

In order to open the valve, I employ a faucet E having a cylindrical end adapted to fit the cylindrical opening C of the bushing. Within this bushing is an inwardly projecting pin L.

The faucet body has a longitudinal channel M cut in the side, extending from the inner end a short distance along the barrel and there connecting with an inclined channel M′ which extends part way around the barrel of the faucet. In the center of the inner end of the faucet body is a projecting pin O which when the faucet is introduced will form a contact with the center of the cross K. When the faucet barrel is introduced so that the slot M is guided upon the pin L, the faucet is first seated upon the elastic washer D in the exterior chamber, thus forming a joint to prevent leakage at that point. The pin then being opposite the inclined slot M' of the faucet barrel, the latter is turned, and the angle of the incline is such that it forces the faucet barrel inwardly, thus compressing the washer D. At the same time, the projecting pin O, acting against the center of the cross K, forces it and the valve stem J and valve I inwardly until sufficient space is disclosed between the valve and the inner end of the bushing to allow the liquid to flow freely into the inner chamber of the bushing, and thence it flows through between the arms of the cross K, and enters corresponding holes P made in the inner end of the faucet barrel. These holes converge and eventually connect with the single central discharge passage which communicates with the cock at the outer end of the faucet in the usual manner. It will be seen that by this construction, when the faucet barrel is turned within the bushing, the action of the spiral groove M' upon the fixed pin L, will compress the washer D upon its shoulder, making a perfectly tight joint with the end of the faucet. At the same time, the pressure upon the cross K compresses the washer H which allows the valve to be opened, while the washer G expands slightly beyond the inner end of the bushing. As soon as the faucet barrel is turned in the opposite direction, it allows the elasticity of the washer H to force the cross K outward, thus drawing the valve I against its seat and compressing the washer G sufficiently to make a tight joint at that point. As these washers are very enduring, a faucet of this construction will last for a long time without replacing it, and it is not possible to break it or get it out of order from the outside. The groove M' is turned at the end at M² so as to be parallel with the seating end of the barrel, and this locks the faucet firmly in place when seated.

Having thus described my invention, what I claim as new, and desire to secure by Letters Patent, is—

1. A tap for barrels consisting of a bushing adapted to be secured in a cask and having a plain flat inner end, a corresponding disk valve adapted to close against the end of the bushing, having a valve stem extending inwardly, and a cross fixed to the inner end of the valve stem, a circular flange formed and projecting inwardly in the chamber of the bushing between the valve and the cross, elastic washers G and H fitted upon opposite sides of said flange, one of which acts against the cross to force it inwardly and keep the valve closed, and the other serves to form a seat and joint for the valve, substantially as herein described.

2. A bushing adapted to be secured in a cask, having a cylindrical outer chamber, an inner chamber of smaller diameter forming a shoulder between the two for the reception of an elastic washer, an interiorly projecting flange surrounding the inner chamber midway of its length, elastic washers seated upon opposite sides of said flange, one of which projects slightly beyond the inner end of the bushing a disk valve fitting the inner end of the bushing and forming a seat upon the end of bushing and said washer, a central stem projecting inwardly from the valve, an open cross fixed to the inner end of said stem, the arms of said cross resting upon an elastic washer which rests upon the adjacent side of the flange so that the elasticity of said washer retains the valve normally in a closed position, a faucet barrel having a longitudinal and diagonally connected slot formed in one side and adapted to move over a pin L within the bushing whereby the faucet barrel is seated upon the exterior washer when introduced, and a pin projecting from the center of the faucet barrel adapted to press upon the cross so that by the rotation of the faucet, the diagonal channel advances it and opens the valve by compressing the washer upon which the cross rests and allows it to close by the expansion of said washer when the faucet is removed, substantially as herein described.

In witness whereof I have hereunto set my hand.

MARX PETER SCHETZEL.

Witnesses:
S. H. NOURSE,
H. F. ASCHECK.